United States Patent
Narasimhan et al.

(10) Patent No.: US 7,694,874 B2
(45) Date of Patent: Apr. 13, 2010

(54) OVER-THE-AIR DEVICE PROVISIONING AND ACTIVATION

(75) Inventors: Subram Narasimhan, Saratoga, CA (US); Kenneth P. Kiraly, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1010 days.

(21) Appl. No.: 11/277,876

(22) Filed: Mar. 29, 2006

(65) Prior Publication Data

US 2008/0164304 A1 Jul. 10, 2008

(51) Int. Cl.
*G06F 17/00* (2006.01)
(52) U.S. Cl. .................. 235/375; 235/383; 235/472.01; 235/472.02; 235/492; 455/411; 455/418; 455/419; 455/435.1; 705/1; 705/26; 705/51; 705/59; 705/400
(58) Field of Classification Search ............ 235/472.01, 235/472.02, 375, 383, 492; 455/418, 419, 455/411, 435.1; 705/1, 26, 51, 59, 400
See application file for complete search history.

(56) References Cited

U.S. PATENT DOCUMENTS

| | | | |
|---|---|---|---|
| 5,534,888 A | 7/1996 | Lebby et al. | |
| 5,566,098 A | 10/1996 | Lucente et al. | |
| 5,603,084 A | 2/1997 | Henry, Jr. et al. | |
| 5,663,748 A | 9/1997 | Huffman et al. | |
| 5,761,485 A | 6/1998 | Munyan | |
| 5,847,698 A | 12/1998 | Reavey et al. | |
| 5,887,253 A | 3/1999 | O'Neil et al. | |
| 6,341,270 B1 | 1/2002 | Esposito et al. | |
| 6,393,298 B1 | 5/2002 | Fulton | |
| 6,879,825 B1 * | 4/2005 | Daly ........................ | 455/419 |
| 6,915,272 B1 | 7/2005 | Zilliacus et al. | |
| 6,947,922 B1 | 9/2005 | Glance | |
| 7,009,596 B2 | 3/2006 | Seet et al. | |
| 7,027,575 B1 * | 4/2006 | Burgess ................. | 379/201.01 |
| 7,298,851 B1 | 11/2007 | Hendricks et al. | |
| 7,304,635 B2 | 12/2007 | Seet et al. | |
| 7,350,704 B2 | 4/2008 | Barsness et al. | |
| 2002/0037724 A1 | 3/2002 | Chatterjee et al. | |
| 2002/0066033 A1 * | 5/2002 | Dobbins et al. ............. | 713/201 |

(Continued)

OTHER PUBLICATIONS

PCT International Search Report and Written Opinion for PCT Application No. PCT/US2008/057867, mailed on Aug. 7, 2008, 13 pgs.

(Continued)

*Primary Examiner*—Daniel A Hess
*Assistant Examiner*—Ali Sharifzada
(74) *Attorney, Agent, or Firm*—Lee & Hayes, PLLC

(57) ABSTRACT

Simplified wireless device activation may be achieved using temporary and permanent numbers used to connect to a wireless service provider. In one implementation, an electronic book reader device includes a memory that contains a temporary number that may be used to connect to a wireless service provider. The temporary number may be replaced with a permanent number that is used to connect to the wireless service provider. This replacement may occur once the electronic book reader device connects with the wireless service provider for the first time. The permanent number may be used to connect to the wireless service provider after the initial connection with the wireless service provider has transpired.

27 Claims, 10 Drawing Sheets

U.S. PATENT DOCUMENTS

| | | |
|---|---|---|
| 2002/0128984 A1 | 9/2002 | Mehta et al. |
| 2004/0033797 A1 | 2/2004 | Raivisto et al. |
| 2004/0064369 A1 | 4/2004 | Kato |
| 2004/0138958 A1* | 7/2004 | Watarai et al. ............... 705/26 |
| 2004/0242209 A1* | 12/2004 | Kruis et al. .............. 455/414.1 |
| 2005/0186942 A1 | 8/2005 | Griffin |
| 2006/0168123 A1* | 7/2006 | Krstulich .................... 709/219 |
| 2006/0259462 A1* | 11/2006 | Timmons ...................... 707/3 |
| 2006/0281058 A1 | 12/2006 | Mangoaela |
| 2007/0011061 A1 | 1/2007 | East |
| 2008/0171532 A1 | 7/2008 | Shieh et al. |

OTHER PUBLICATIONS

PCT International Search Report and Written Opinion for PCT Application No. PCT/US2007/089123, mailed on Jun. 27, 2008, 10 pgs.

* cited by examiner

OVER-THE-AIR DEVICE PROVISIONING AND ACTIVATION

BACKGROUND

Generally, an activation process for a recently acquired wireless device is an intensive and time consuming process. The process often requires a user to bring the wireless device to a service center or retailer in order to activate the device. A representative at the service center or retailer manually programs the wireless device with a telephone number. The representative normally has to also notify a wireless service provider of the assigned telephone number and a serial number associated with the wireless device. Improving the activation process for wireless devices may be beneficial to both providers and customers using the devices.

SUMMARY

Arrangements, methods and devices are described that relate to wireless devices that are provisioned for activation without necessitating having a user set foot in a brick and mortar establishment. In one implementation, an electronic book ("eBook") reader device includes a memory that contains a temporary number that may be used to connect to a wireless service provider. The temporary number may be replaced with a permanent number that is used to connect to the wireless service provider. This replacement may occur once the eBook reader device connects with the wireless service provider for the first time. The permanent number may be used to connect to the wireless service provider after the initial connection with the wireless service provider has transpired.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to a provisioning and activation environment that enables customers to activate wireless devices without having the set foot in a brick and mortar establishment. In one implementation, a customer fills out an online order form for an electronic book ("eBook") reader device that is enabled with wireless communications technology. Such an order form may be found on an ecommerce merchant's website. The information provided by the customer may include the customer's name, contact information (e.g., address and phone number), and billing information. The ecommerce merchant, in concert with a wireless device distributor and a wireless service provider, provisions and delivers an eBook reader device to the customer. The customer merely turns on the eBook reader device to complete activation of the device. The power-enabled device is now ready to use.

These and other aspects are described below in various example implementations of a wireless enabled device that presents electronic books, news print, or other forms of text and graphic content. More specifically, the description herein provides a non-limiting implementation of an electronic device in the form of an eBook reader device that has wireless communications technology. It is noted, however, that various aspects and features described herein may be implemented in other electronic devices besides eBook reader devices including, for example, portable computers, personal digital assistants (PDAs), and the like. Moreover, an eBook reader device according to the described implementations may have functionality that enables the device to browse the Internet, maintain a calendar, play audio and video media, and so forth.

The terms "book" and/or "eBook" include electronic or digital representations of printed works, as well as digital content that may include text, multimedia, hypertext and/or hypermedia. Examples of printed works include, but are not limited to, books, magazines, newspapers, periodicals, journals, reference materials, telephone books, textbooks, anthologies, instruction manuals, proceedings of meetings, forms, directories, maps, etc. Accordingly, the terms book and/or eBook may include any content that is in electronic or digital format.

Various aspects related to providing provisioned wireless devices are described below with reference to FIGS. 1-10.

Exemplary Provisioning and Activation Environment

This section provides a reader with an overview of a number of different devices/entities that may be part of an environment that is capable of provisioning and activating wireless devices. A more detailed description of the different devices/entities is given with reference to FIGS. 2-10.

Figure 1:
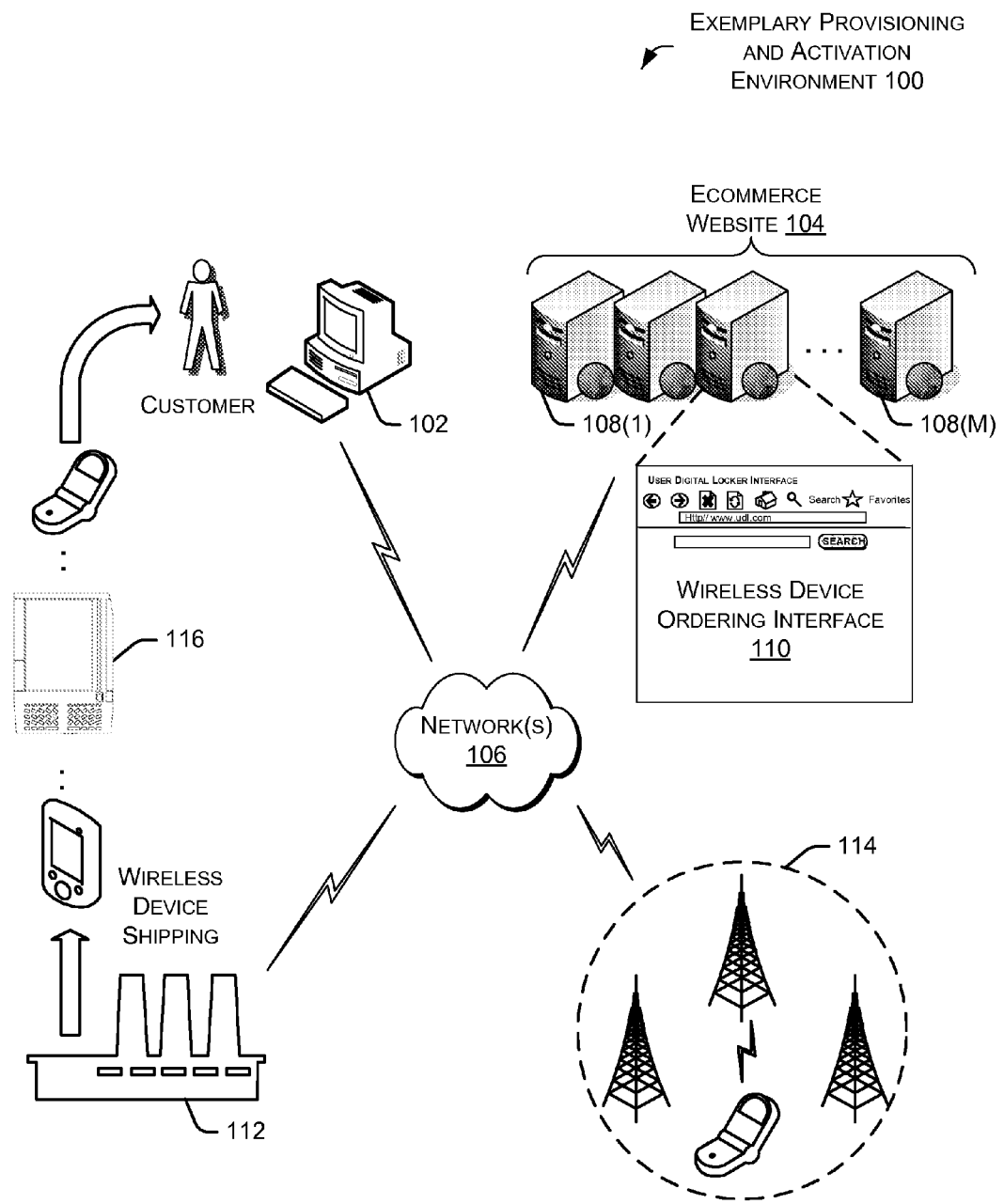
FIG. 1 illustrates an exemplary provisioning and activation environment in which customers may purchase and activate wireless devices without having to step inside a brick and mortar establishment. The environment includes at least one computing device capable of connecting to a number of entities that provide services related to provisioning and activation of wireless devices. In one implementation, an electronic book ("eBook") reading device, having incorporated wireless communications technology, is provisioned and activated by way of the environment illustrated in FIG. 1.

FIG. 1 illustrates an exemplary provisioning and activation environment 100 that includes entities that supply provisioned wireless devices to customers. In the environment 100, a customer computing device 102 can access a website 104 via a network 106. In one implementation, an individual uses the customer computing device 102 and the network 106 to interface with the website 104 to order an electronic book ("eBook") reader device that has wireless communications technology and which is capable of being activated without having to set forth in a brick and mortar establishment. The network 106 is representative of many different types of networks, such as cable networks, the Internet, and wireless networks.

The website 104 is hosted on one or more servers 108(1), . . . , 108(M), perhaps arranged as a server farm. Other server architectures may also be used to host the website 104. The website 104 is capable of handling requests from many users and serving, in response, various webpages and/or user interfaces that can be rendered on the computing device 102. The website 104 is representative of essentially any site supporting user interaction, including online retailers and other ecommerce merchants, informational sites, search engine sites, news and entertainment sites, and so forth. In one implementation, the website 104 is an ecommerce shopping portal that sells many different wares to customers that shop online. For example, the website 104 may list many wireless devices that may be purchased through the site. Some of those wireless devices are provisioned so that they can be activated by a customer without having to physically go to a brick and mortar establishment.

The website 104 may also provide other services. In one implementation, the website 104 fulfils orders for eBook reader devices that have integrated wireless communications technology. The website 104 may also store information that may be used with eBook reader devices that include wireless communications technology. For example, the website 104 may store electronic books, news print, or other forms of text and graphic content that may be used with eBook reader devices and/or other types of devices capable of processing such content. The website 104 may also offer wireless downloads and/or delivery, as part of a service that includes wireless communications, of such content in electronic form to provisioned and activated devices in accordance with the implementations described herein. To that end, the website 104 may interface with a wireless device distribution center 112 and a wireless service provider 114.

An ecommerce service, such as the website 104, may also use geolocation technology and methods to deliver electronic or digital content to eBook reader devices and/or other types of devices capable of processing such content. For example, ecommerce service providers may use geolocation technology and methods to deliver content that is geographically contextual based on a location of a given wireless device. Such content may include geographically pertinent maps, advertisements, newspapers, periodicals, movie reviews, and so forth. Locating the position of these wireless devices may be based on Internet Protocol address tracking, triangulation, and other factors. An ecommerce service employing a simple geolocation solution can reliably determine what country a user is in, and a more sophisticated solution can locate a user down to city, street or house level.

The computing device 102 (also referred to as "client computers" or simply "clients") is illustrated as a personal computer, but may also be implemented as other devices, such as wireless phones, tablet computers, set-top boxes, game consoles, laptop computers, portable digital assistants (PDA), and so forth. The computing device 102 is equipped with one or more processors and memory to store applications and data. A browser application may be stored in the memory and executes on a processor to provide access to the website 104. The browser renders webpages served by the website 104 on an associated display. One such webpage is a wireless device ordering interface 110.

When a customer directs a client 102 to request one or more webpages and/or interfaces from the website 104, the computing device 102 sends uniform resource identifier (URI) requests to the servers 108. Upon receiving a URI request, the servers 108 return a webpage back to the requesting client computer 102. The computing device 102 invokes a browser to render the webpage, allowing the user to interact with the webpage. In one implementation, a webpage that includes the wireless device ordering interface 110 is returned to a requesting client device 102.

The ecommerce website 104 sends wireless device orders to the wireless device distribution center 112 for fulfillment. In one implementation, the distribution center 112 fulfils received wireless device orders by shipping wireless devices directly to customers. For example, as is illustrated in FIG. 1, an eBook reader device 116, which includes wireless connectivity technology, is shipped directly to a customer. In another implementation, the wireless device distribution center 112 ships wireless devices to a merchant requesting the devices. The merchant then ships the wireless devices to customers with outstanding orders. The wireless device distribution center 112 may also ship many types of wireless devices. For example, the distribution center 112 may deliver wireless phones, wireless enabled personal assistants (PDAs), and so forth.

Regardless of the type of wireless device ordered, customers receive wireless devices that are fully provisioned and ready to connect to the wireless service provider 114; the customers simply power-up received wireless devices and a connection is automatically established with the wireless service provider 114. Further details related to this aspect of the described implementations are given below.

In one implementation, the ecommerce website 104, or another entity, may absorb wireless connectivity costs associated with the use of fully provisioned wireless devices. The ecommerce website 104 may recoup those costs through users' use of the fully provisioned wireless devices. For example, such a fully provisioned wireless device may be an eBook reader device. The ecommerce website 104 may recover the fees and costs associated with providing wireless communications services by offering electronic content that may be used with such eBook reader devices.

The website 104 may offer media devices that have wireless communications technology and that may be activated over-the-air. The over-the-air activation process includes a self-registration process that allows the media devices to request services from a commerce entity, such as the website 104. In one implementation, once activated, the media devices may wirelessly communicate with the website 104, using the services of the wireless service provider 114, and download electronic content offered for sale. The user of the media device may not be charged for the wireless connectivity provided by the service provider 114; such charges and/or fees may be absorbed by the entity hosting the website 104.

In another implementation, the website 104 or ecommerce service may offer other services, such as premium services, that would require users to pay fees and costs associated with the use of wireless services. For example, wireless services used in conjunction with browsing the Internet with a wireless device according to the described implementations may be fee based, or the ecommerce service may charge various fees depending on the type of media (e.g., audio, video, etc.) wirelessly downloaded from the website 104. These types of additional fees may be waived if users agree to receive advertisements, or other third-party information, on a periodic basis.

The wireless service provider 114 includes an array of base stations, mobile switching centers, and so forth, that enable wireless devices to communicate with other wireless devices. The wireless service provider 114 may also include infrastructure that enables wireless devices to connect to the public switched telephone network (PSTN) and other networks (e.g., the Internet). Therefore, the wireless service provider 114 is fully enabled to provide and facilitate connection and communication with telephones, facsimile machines, data devices, computing devices, web cameras, and so forth. The service provider 114 illustrated in FIG. 1 is sometimes referred to as a wireless local loop (WLL), a wireless digital subscriber network (wDSN), or simply a wireless device network.

Environment Entities Implementations

Figure 2:
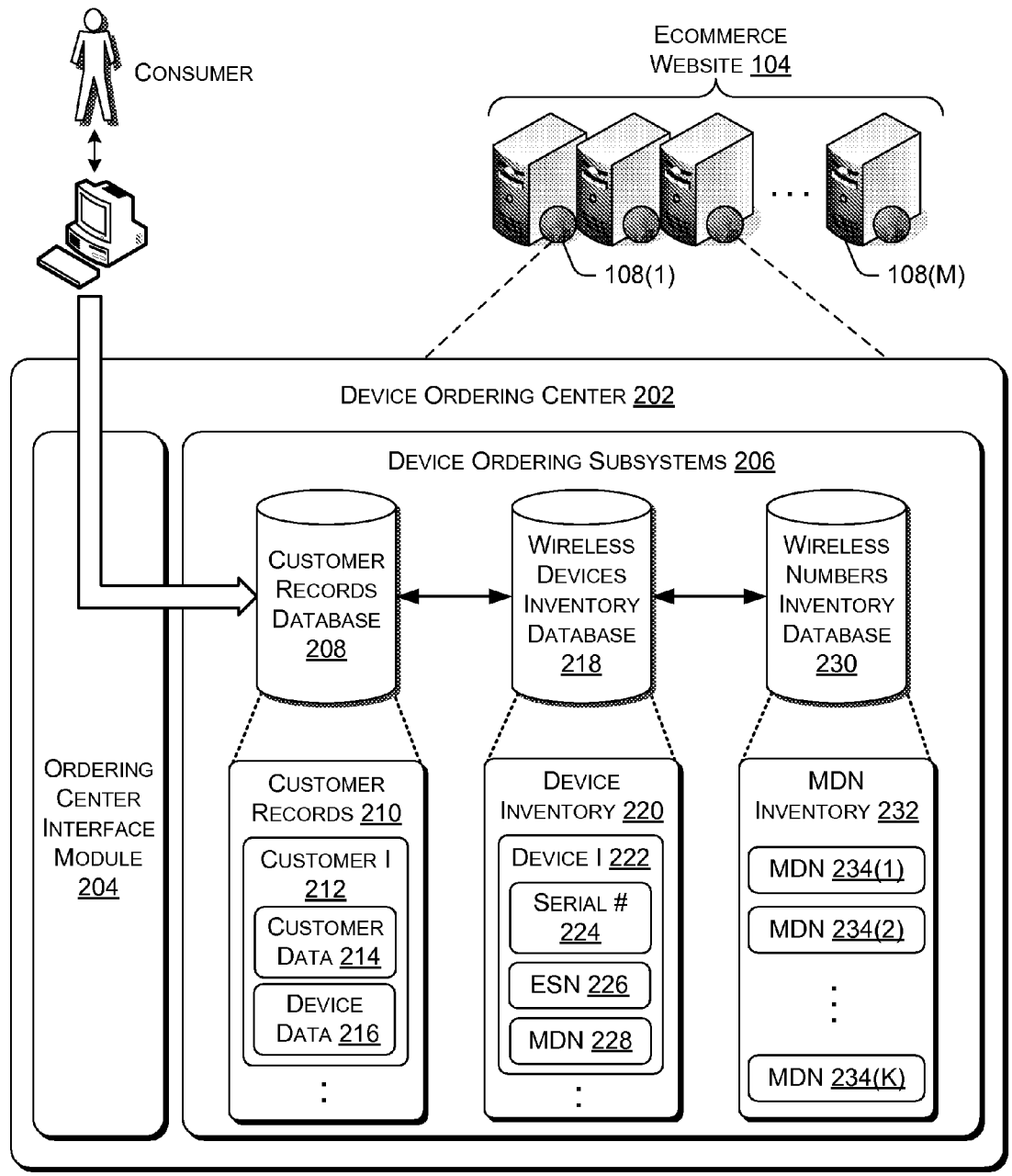
FIG. 2 illustrates a wireless device ordering center that customers may interface with to order wireless devices. The device ordering center is shown as being part of an ecommerce website.
Figure 3:
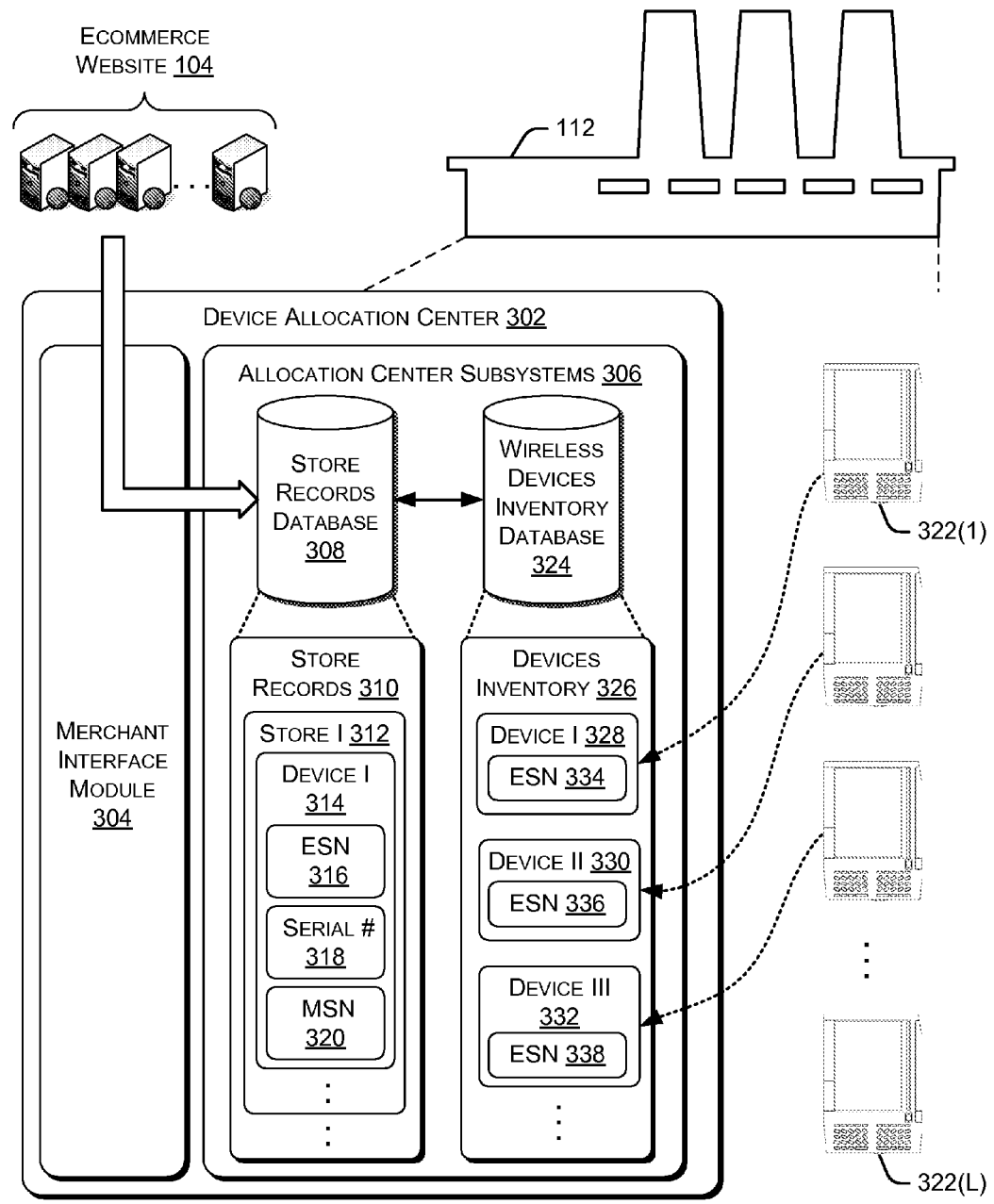
FIG. 3 illustrates a wireless device allocation center that is linked with an entity that produces wireless devices. The wireless device allocation center is shown as being part of a wireless device distribution facility that builds and/or houses wireless devices.
Figure 4:
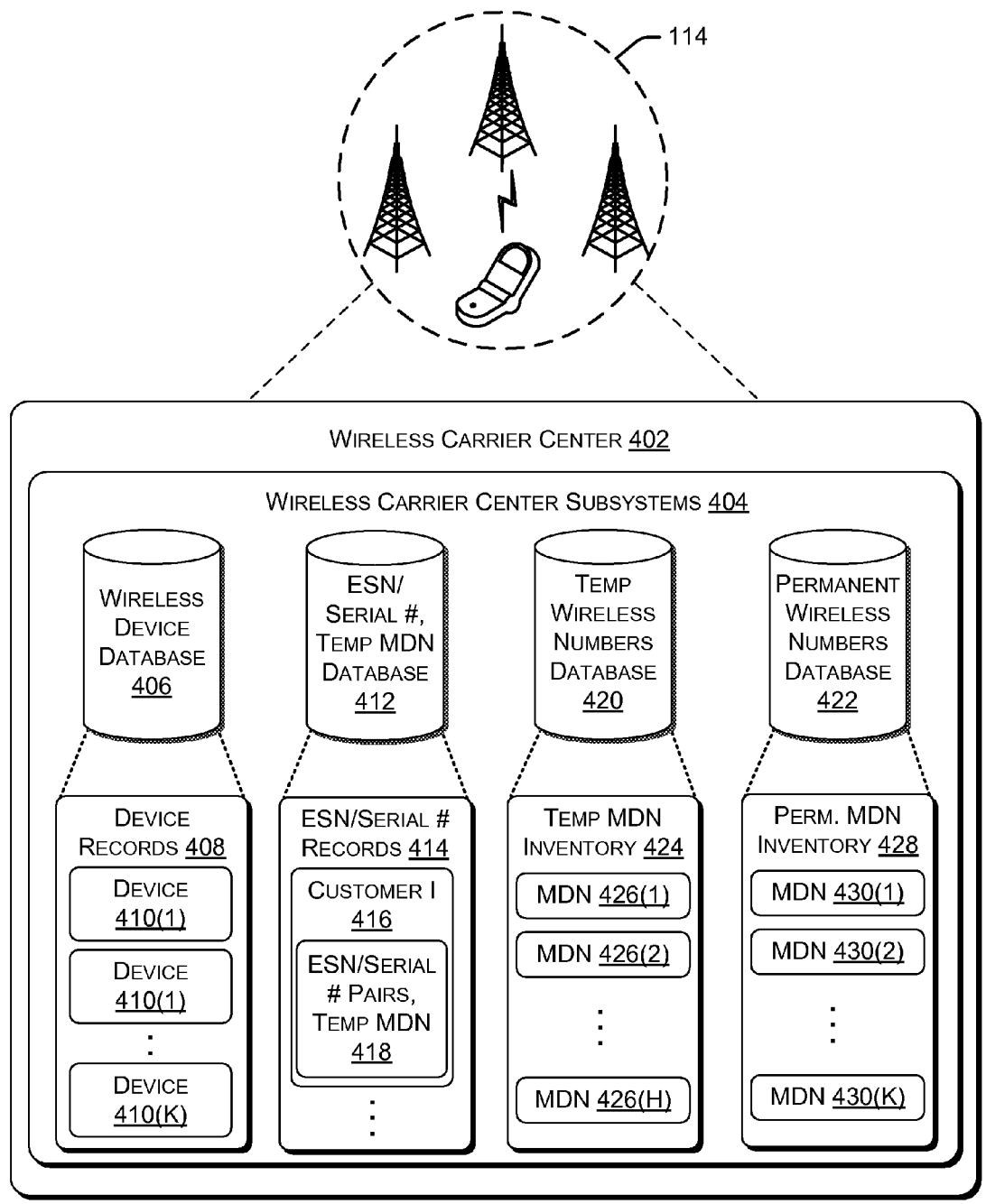
FIG. 4 illustrates a wireless carrier center that is associated with a wireless service provider. The wireless carrier center enables registered wireless devices to communicate with other wireless devices, wireline telephone services, the Internet, and so forth.

FIGS. 2-4 illustrate exemplary implementations of the website 104, the wireless device distribution center 112, and the wireless service provider 114, respectively, that were first introduced with reference to FIG. 1. The various modules, databases, records and so forth discussed with reference to FIGS. 2-4 are not to be considered as representative of a complete set of operational elements connected with the implementations 104, 112, and 114. In particular, depending on operational requirements, the website 104, the wireless device distribution center 112, and the wireless service provider 114 may include operational elements that are not illustrated in FIGS. 2-4.

The following description of the website 104, the wireless device distribution center 112, and the wireless service provider 114, with reference to FIGS. 2-4, is intended to provide details associated with the exemplary implementations 104, 112, and 114. However, interplay between the implementations 104, 112, and/or 114 may not be fully understood until the description in connection with the remaining FIGS. 5-10 is read.

The various implementations described with reference to FIGS. 2-4 may be realized using one more computing devices. Such computing devices have processing capabilities and memory suitable to store and execute computer-executable instructions. Therefore, the described implementations may be realized as software or computer-executable instructions stored in memory of one or more computing devices and executed by one or more processors of the computing devices. The memory may be implemented as non-removable persistent storage of the computing devices, although other suitable computer storage media may also be used. An example of a computer device, that may be used to realize such computing devices, is provided later with reference to FIG. 10.

FIG. 2 illustrates a device ordering center 202 that may be implemented on one or more of the servers 108. The device ordering center 202 includes an ordering center interface module 204 for receiving information from customers, and for generating output to the customers. The output may include data used to construct a user interface that allows a customer to input personal data, billing information, and so forth, that is used to place an order for a wireless device. The input processed by the ordering center interface module 204 may include information provided by a customer that is used to process an order for a wireless device. A user interface that may be constructed by the interface module 204 is illustrated in FIG. 1 as the wireless device order interface 110.

The ordering center interface module 204 provides a portal to device ordering subsystems 206 employed by the device ordering center 202. The device ordering subsystems 206 include a customer records database 208 that stores customer records 210. The customer records 210 include customer and wireless device information associated with customers that have ordered wireless devices through the website 104. In FIG. 2, a record 212 linked to a customer I is shown. The record 212 includes customer data 214, which may include a customer's name, their address, and billing information (e.g., credit card data).

The record 212 also includes device data 216. The device data 216 may include information pertaining to a wireless device that the customer ordered through the website 104. For example, the device data 216 may include a merchant assigned serial number, an electronic serial number (ESN) and a temporary or permanent mobile directory number (MDN). Each wireless device is assigned a unique ESN, which identifies the device to a wireless service provider for the purpose of placing and receiving calls. The unique ESN is assigned when a wireless device is manufactured. An MDN is normally a 10-digit directory number that may be used to call a wireless device. ESNs and MDNs are commonly used in the wireless industry; therefore, additional explanation is not provided in relation to these numbers.

The ordering subsystems 206 also include a wireless devices inventory database 218 that stores inventory records 220 pertaining to wireless devices that are unassigned to customers. The wireless devices referenced in the store inventory records 220 are considered 'on-hand' inventory that may be purchased by customers. A device I record 222 of the inventory records 220 is shown as including a serial number 224, an ESN 226 and an MDN 228. The wireless devices inventory database 218 may include many device records 222. The MDN 228 is a temporary MDN number that is assigned by the ecommerce merchant that is responsible for the website 104. As will be discussed later in this document, the MDN 228 is replaced with a permanent MDN when a wireless device linked to the device I record 222 is first powered on by a customer.

A wireless numbers inventory database 230 is part of the device ordering subsystems 206. The wireless numbers inventory database 230 stores MDN inventory 232 that includes many temporary MDNs 234(1), ..., 234(K). These temporary MDNs 234(1), ..., 234(K) may be assigned to wireless devices allocated to the website 104. Temporary MDNs assigned to wireless devices purchased by customers are ultimately replaced by permanent MDNs. Permanent MDNs are assigned by the wireless service provider 114. This replacement process is discussed in connection with FIG. 8.

FIG. 3 illustrates a device allocation center 302 that may be implemented by the wireless device distribution center 112 first referenced in connection with FIG. 1. The device allocation center 302 includes a merchant interface module 304 for receiving information from merchants, and for generating output to the merchants. One such merchant may be the ecommerce merchant hosting the website 104. The output may include data used to construct an interface that allows a merchant to input wireless device ordering information, billing information, and so forth, that is needed to place an order for wireless devices that may be offered for sale on the website 104. The input processed by the merchant interface module 304 may include information provided by a merchant that is used to process an order for a number of wireless devices. Successfully ordered wireless devices may be housed at the device distribution center 112 until a merchant requests delivery of the wireless devices to customers.

The merchant interface module 304 provides a portal to allocation center subsystems 306 that are employed by the device allocation center 302. The allocation center subsystems 306 include a store records database 308 that houses store records 310 that are associated with merchants that order wireless devices from the device distribution center 112. The store record database 308 is shown as including a record 312 that is linked to a store I. This store I is representative of at least one merchant that has ordered wireless devices from the device distribution center 112. The store record database 308 may include many additional records that are linked to merchants that have purchased wireless devices.

The record 312 includes data 314 associated with a wireless device I. Other wireless device data may also be included in the record 312. The wireless device data referenced in the record 312 relates to wireless devices that have been ordered by a merchant. In this case, the procuring merchant is considered the store I linked to the record 312. The data linked to the device I includes an ESN 316, a serial number 318 and a temporary MDN 320. As is discussed later, in connection with FIGS. 5-6, a merchant that is ordering wireless devices provides the device distribution center 112 with the serial number 318 and the temporary MDN 320. This is true for other wireless devices allocated by the device distribution center 112.

The device distribution center 112 manufactures wireless devices, or obtains wireless devices from a factory that manufactures the devices. Such wireless devices are illustrated in FIG. 3 as wireless devices 322(1), . . . , 322(L). The wireless devices 322(1), . . . , 322(L) on-hand at the device distribution center 112 are tracked by a wireless devices inventory database 324. The inventory database 324 has wireless devices inventory 326 that includes wireless device records 328-332. The wireless device records 328-332 are each linked to a wireless device that is available for purchase. The inventory database 324 may include many other wireless device records. The device records 328-332 each include an ESN reference 334-338, respectfully. ESNs are assigned to wireless devices when they are manufactured. Wireless device records stored in the inventory database 324 are linked to wireless devices at the device distribution center 112 that have not been allocated to a merchant.

FIG. 4 illustrates a wireless carrier center 402 that may be implemented by the wireless service provider 114 discussed with reference to FIG. 1. Although not shown in FIG. 4, the wireless carrier center 402 may include technology that enables entities to interface with the center 402. Such technology may be similar to the interfaces 204 and 304 discussed in connection with the device ordering center 202 and device allocation center 302, respectively.

The wireless carrier center 402 employs wireless carrier center subsystems 404 that are used to manage many aspects related to wireless devices that may make use of the wireless bandwidth offered by the wireless service provider 114. A wireless device database 406 is used by the wireless carrier center 402 to keep record of wireless devices that have authorized access to the wireless service provider 114. More specifically, the wireless device database 406 includes device records 408 that include wireless device records 410(1), . . . , 410(K) that are each linked to a wireless device. The wireless devices referenced in the wireless device database 406 are wireless devices that have already been used at least once by a customer. Thus, the wireless device database 406 references wireless devices that have a permanent MDN.

A database 412 is part of the wireless carrier center subsystems 404. The database 412 includes records 414 that include paired ESNs and serial numbers received from a merchant. These pairs are assigned to wireless devices that the merchant offers for sale. The ESN and serial number pairs of the records 414 may also be linked to a temporary MDN. The wireless service provider 114 uses the records 414 to verify the authenticity of wireless devices that request use of the wireless bandwidth offered by the provider 114.

In FIG. 4, the database 412 is shown as including a record 416 that is linked to a customer I. This customer I is representative of a merchant that has reserved a number of wireless devices for resale, such as the merchant hosting the website 104. The record 416 includes a paired ESN and serial number, and a temporary MDN. In one implementation, the paired ESN and serial number, and the temporary MDN are sent to the wireless service provider 114 after a customer has purchased a wireless device from the merchant hosting the website 104. The record 416 is used to verify the authenticity of the purchased wireless device when the device first requests service from the provider. The foregoing is discussed in greater detail with reference to FIGS. 5-8.

The wireless carrier center subsystems 404 further include two databases 420 and 422 that include an inventory of MDNs that are available for distribution and association with wireless devices. The database 420 includes an inventory 424 of temporary MDNs 426(1), . . . , 426(H). Some or all of the temporary MDNs 426(1), . . . , 426(H) may be offered to merchants that sell wireless devices that may be activated without having to set foot in a brick and mortar establishment. Use of the temporary MDNs 426(1), . . . , 426(H) in wireless devices purchased from such a merchant is discussed in further detail with reference to FIGS. 5-8. Permanent MDNs 430(1), . . . , 430(K) of the database 422 are used to replace temporary MDNs linked to wireless devices. This replacement occurs when a wireless device requests service from the wireless service provider 114 for the first time.

Exemplary Processes

FIGS. 5-8 illustrate example processes related to provisioning and activation of wireless devices. In one implementation, the processes may be used to provision and activate an eBook reader device. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the example processes of FIGS. 5-8 may be described with reference the various elements that are part of the exemplary provisioning and activation environment 100. In particular, many acts described below may be implemented by/using the computing device 102, the website 104, the wireless device distribution center 112 and/or the wireless service provider 114.

Figure 5:
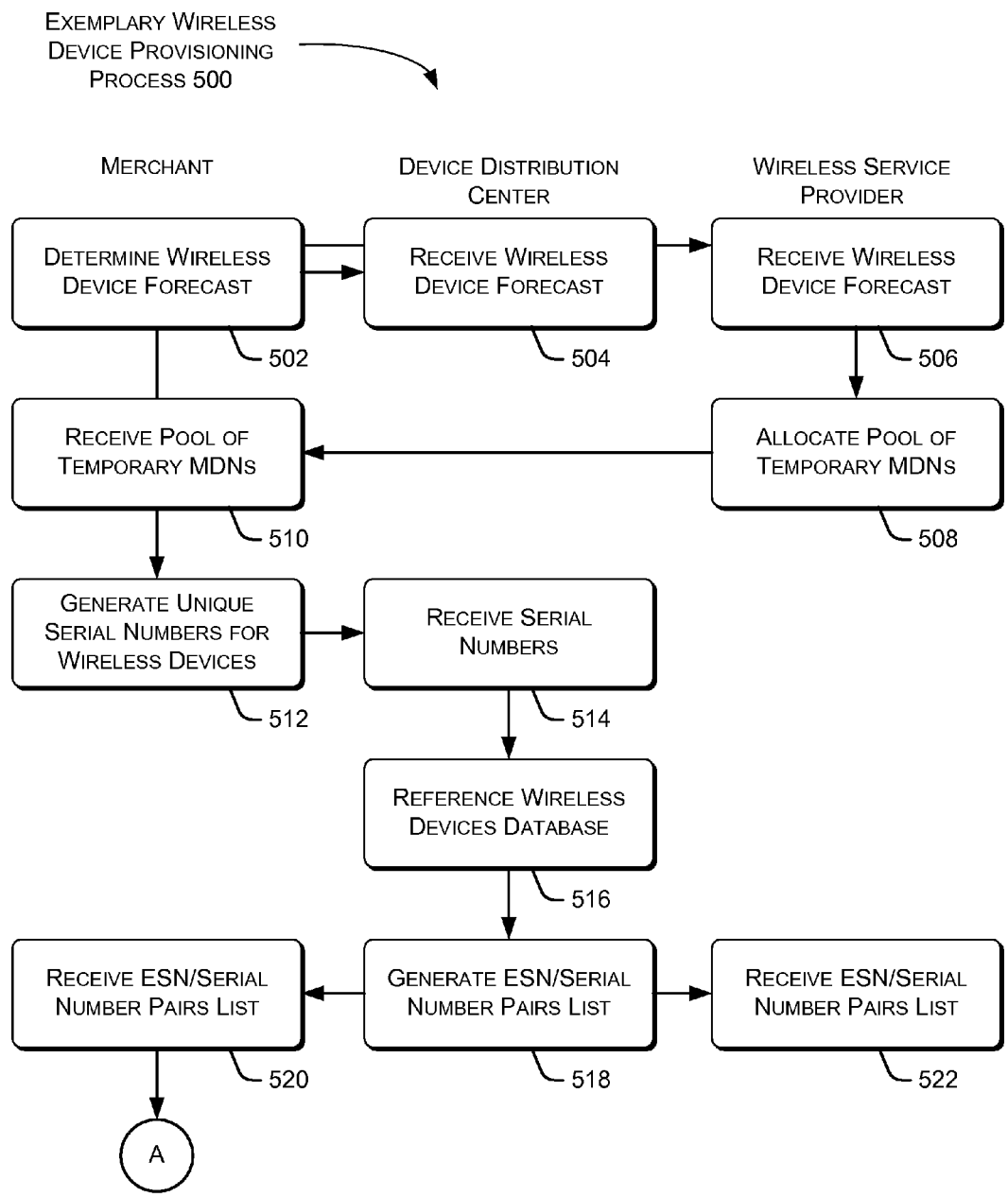
FIGS. 5-6 show a flow diagram of a process for provisioning a wireless device.
Figure 6:
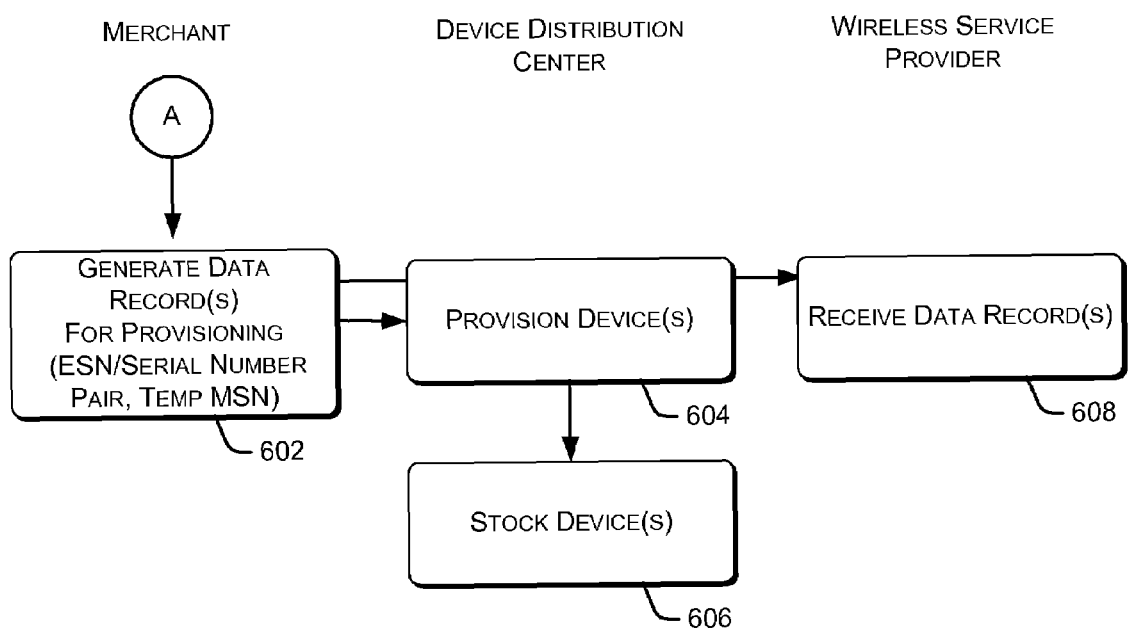

FIGS. 5-6 illustrate an exemplary wireless device provisioning process 500 that may be used to provision wireless devices that can be activated and used with a wireless service provider without having to set foot in a brick and mortar establishment. In FIGS. 5-6, acts are separated into three columns according to the entity (i.e., merchant, device distribution center, or wireless service provider) that is performing the act.

At block 502, a merchant, such as the ecommerce merchant hosting the website 104, forecasts the number of wireless devices that may be sold to customers over a defined time period. Such wireless devices may include eBook reader devices. The wireless device forecast is sent to the device allocation center 112 and the wireless service provider 114. Blocks 504 and 506 show that the device allocation center 112 and the wireless service provider 114 both receive the wireless device forecast.

At block 508, the wireless service provider 114 allocates a pool of temporary MDNs based on the forecast provided by the merchant. The pool of temporary MDNs is allocated from the temporary MDNs stored in the temporary wireless numbers database 420. At block 510, the merchant receives the pool of temporary MDNs from the wireless service provider 114. The merchant stores the temporary MDNs in the wireless numbers inventory database 230.

At block 512, the merchant generates a unique serial number for each one of the temporary MDN received from the wireless service provider 114. A random number generator (not shown) or other number/alphanumeric generating technology may be used to generate the unique serial numbers. The unique serial numbers are sent to the device distribution center 112. Block 514 shows that the serial numbers are received by the device distribution center 112. At block 516, the device distribution center 112 references the wireless devices inventory database 324 and allocates an ESN belonging to a wireless device to each of the serial numbers received from the merchant. At block 518, the allocated ESNs and paired serial numbers are compiled into an ESN/serial number pairs list. The list is saved in the store records database 308 and linked to the merchant that supplied the unique serial numbers.

Blocks 520 and 522 show that the ESN/serial number pairs list is passed to the merchant and the wireless service provider 114. The merchant may temporarily store the list in the wireless devices inventory database 218, or some other memory associated with the website 104. Similarly, the wireless service provider 114 may temporality store the list in the database 412, or some other memory associated with the provider 114.

Referring now to FIG. 6, at block 602, the merchant generates a data record for each ESN/serial number pair received from the device distribution center 112. The process of generating the data records includes associating one of the temporary MDNs, of the wireless numbers inventory database 230, with each of the ESN/serial number pairs. The generated data records are stored in the wireless devices inventory database 218. Recall, each of the data records stored in the inventory database 218 is linked to a wireless device that can be purchased by a customer.

At block 604, data records that include ESN/serial number pairs, and assigned temporary MDNs, are sent to the device distribution center 112. In response, the device distribution center 112 provisions wireless devices so that they include the temporary MDNs and the serial numbers. More specifically, each wireless device that was included on the ESN/serial number list generated at block 518 receives a temporary MDN and a serial number. The provisioned devices are assigned records that are stored in the store records database 308. Each assigned record includes the ESN, the serial number and the temporary MDN associated with a wireless device. At block 606, the wireless devices that have associated records stored in the store records database 308 are designated as available wireless device stock that may be sold by the merchant that sent the data of block 602.

At block 608, the ESN/serial number pairs that have associated temporary MDNs are received by the wireless service provider 112. The received data is stored in the database 412 and may be used by the wireless service provider 112 to verify the authenticity of wireless devices requesting wireless service from the provider 112 for the first time.

The foregoing process described with reference to FIGS. 5-6 readies wireless devices for delivery to customers that order wireless devices through a merchant. In one implementation, the provisioned devices are stored at the device distribution center 112. At the request of a merchant, such as the ecommerce merchant hosting the website 104, the device distribution center 112 ships the provisioned wireless devices to customers. The shipped wireless devices are taken from wireless device stock that is allocated to the ecommerce merchant. Allocation of the wireless devices is achieved when a merchant submits unique serial numbers and associated temporary MDNs that can be linked to unallocated wireless devices housed at the device distribution center 112.

Figure 7:
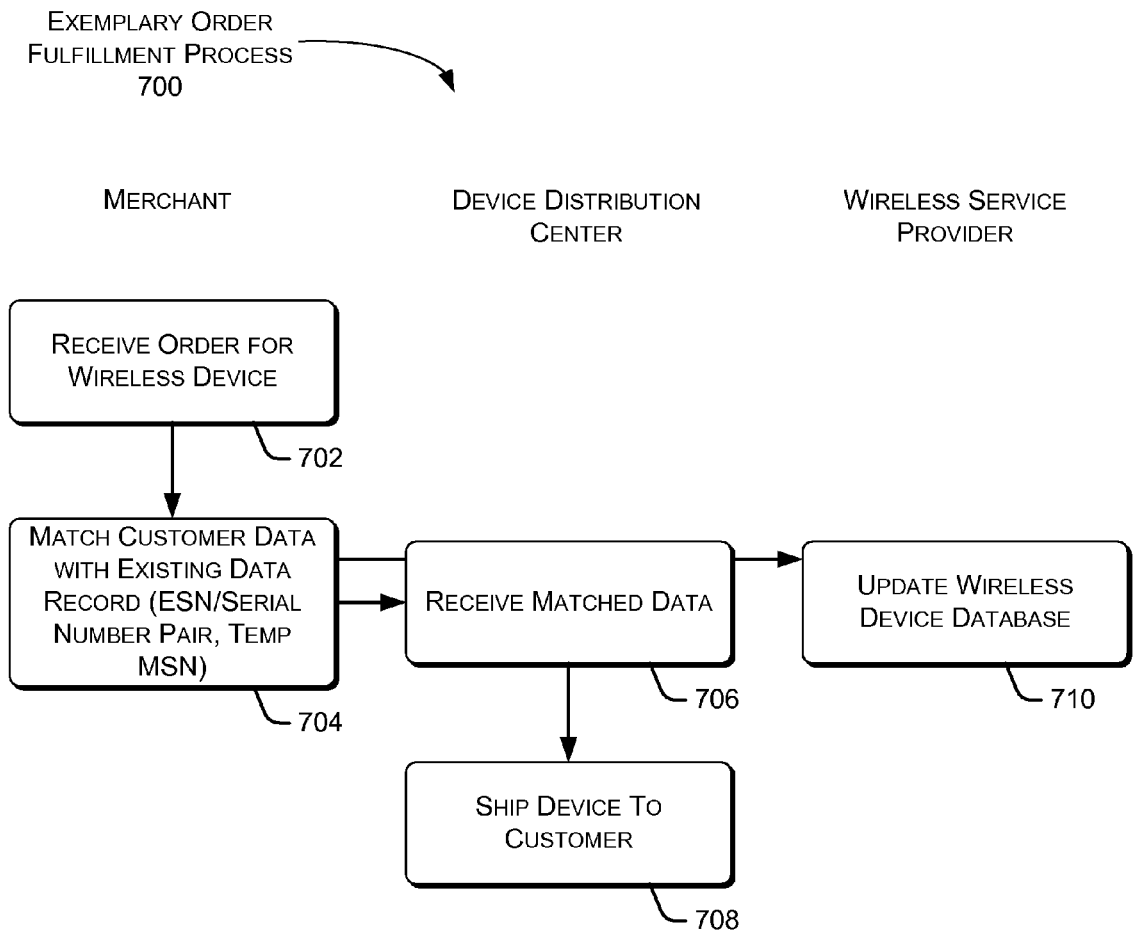
FIG. 7 is a flow diagram of a process for fulfilling a customer's order for a wireless device.

FIG. 7 illustrates an exemplary wireless device fulfillment process 700 that may be used to deliver wireless devices to customers that place an order for a wireless device that can be activated without having to set foot in a brick and mortar establishment. In FIG. 7, acts are separated into three columns according to the entity (i.e., merchant, device distribution center, or wireless service provider) that is performing the act.

At block 702, a merchant receives an order for a wireless device. In one implementation, the ecommerce merchant hosting the website 104 receives an order for an eBook reader device that is fully provisioned and ready for use the moment the reader device is powered on. The order received at block 702 may include a customer's contact and billing information needed to complete an order for a wireless device. At block 704, the customer's contact information is matched with a device record stored in the wireless device inventory database 218. The matched contact information and the device record are linked together and stored in the customer records database 208.

At block 706, the device distribution center 112 receives the matched contact information and the device record from the merchant. The device distribution center 112 compares the device record against the records stored in the store records database 308. If a wireless device record is found in the database 308 that includes an ESN/serial number pair and temporary MDN that match the data of the device record from the merchant, and the wireless device record is allocated to the requesting merchant, the associated wireless device is earmarked for delivery to the customer identified in the contact information. At block 708, the device distribution center 112 ships the earmarked wireless device to the customer.

At block 710, the wireless service provider 114 receives the matched contact information and the device record from the merchant. The wireless service provider 114 uses the received data to augment records already stored in the database 412. Records augmented with customer contact information are one step away from being moved to the wireless device database 406. More specifically, a record augmented with customer data needs only to be updated with a permanent MDN before the record is moved to the database 406. This process is discussed with reference to FIG. 8.

Figure 8:
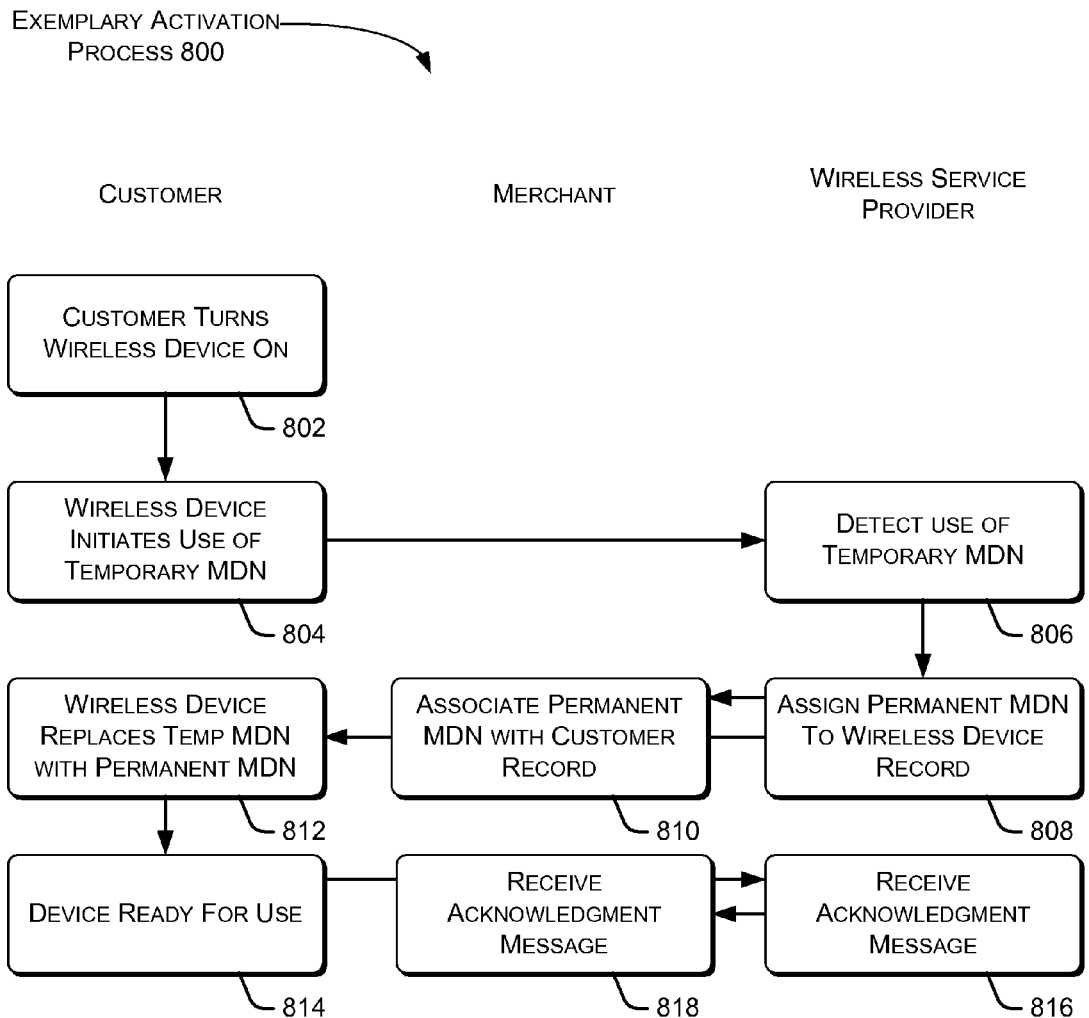
FIG. 8 is a flow diagram of a process for activating a wireless device without having to step inside a brick and mortar establishment.

FIG. 8 illustrates an exemplary wireless device activation process 800 that may be used to fully activate a wireless device without having to set foot in a brick and mortar establishment. In one implementation, a customer activates an eBook reader device according to the activation process 800. In FIG. 8, acts are separated into three columns according to the entity (i.e., customer, merchant, and wireless service provider) that is performing the act.

At block 802, a customer receives a fully provisioned wireless device directly from the device distribution center 112, or alternatively, from the ecommerce merchant hosting the website 104. The customer ordered the wireless device using a computing device interfaced with the Internet (e.g., the computing device 102). The customer powers on the provisioned wireless device. At block 804, the provisioned wireless device contacts the wireless service provider 114 using the temporary MDN allocated to the device.

At block 806, the wireless service provider 114 detects the use of a temporary MDN by referencing records stored in the database 412. The records stored in the database 412 at least include ESN/serial number pairs and temporary MDNs. As described with reference to FIG. 7, some of the records are augmented to include customer data. Ultimately, the wireless service provider 114 is searching for one of these augmented records. After finding a record that includes an ESN, a serial number and a temporary MDN that match the ESN, the serial number and the temporary MDN used by the contacting provisioned wireless device, a permanent MDN is assigned to the retrieved record (block 808). The temporary MDN is removed from the record in the process.

At block 810, the ecommerce merchant updates the customer records database 208 to include the permanent MDN assigned by the wireless service provider 114. The updating process includes identifying a customer record that includes matched contact information and a device record that includes the ESN, the serial number and the temporary MDN of the wireless device powered on at block 802. The temporary MDN of the identified record is replaced with the permanent MDN.

At block 812, the wireless device powered on at block 802 replaces the temporary MDN stored in memory thereof with the permanent MDN received from the wireless service provider 114. At block 814, the wireless device is ready to use; the wireless device sends an acknowledgement message to the wireless service provider 114 that indicates that the permanent MDN was received and is now being used. At block 816, the wireless service provider 114 receives the acknowledgment message and forwards the message to the ecommerce merchant. At block 818, the acknowledgement message is received by the merchant.

Exemplary Wireless Device

Figure 9:
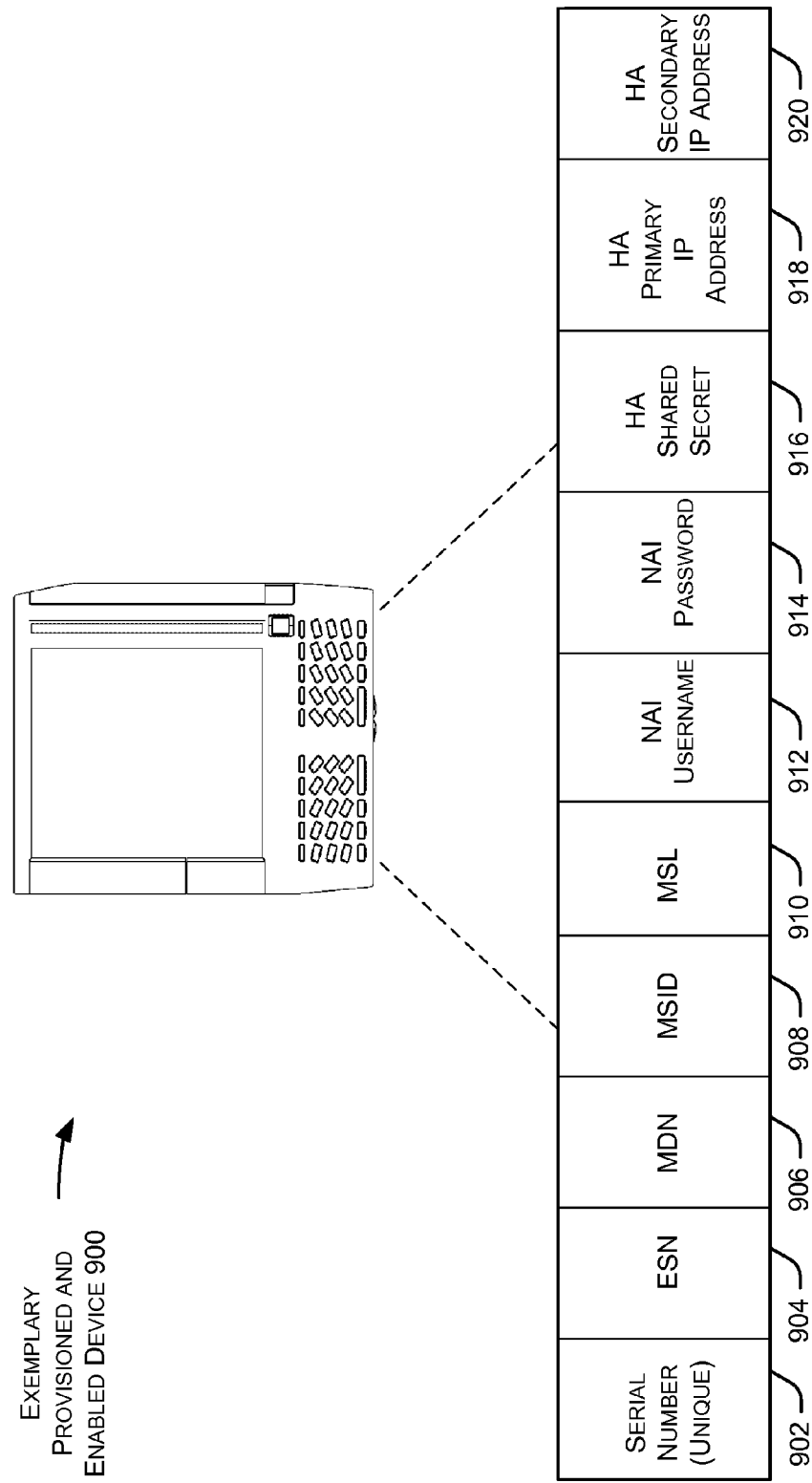
FIG. 9 illustrates an exemplary fully provisioned and activated eBook reader device.

FIG. 9 illustrates an exemplary fully provisioned and activated eBook reader device 900. Although not shown, the eBook reader device 900 includes wireless technology that is capable of interfacing with many different types of wireless service providers. One such wireless service provider is the wireless service provider 114.

The eBook reader device 900 includes data fields 902-920. The data field 902 stores a unique serial number that is assigned by a merchant that offers the eBook reader device 900 for sale. The data field 904 stores an ESN assigned by a manufacturer of the device 900. The data field 906 stores a temporary MDN and later a permanent MDN, according the implementations described herein. The data field 908 is optional and stores a mobile station identification (MSID). MSIDs are normally used when a wireless device is roaming. The use of MSIDs is known in the art; therefore, addition description is not provided herein. The data field 910 is optional and stores master subsidy lock (MSL). The MSL is generally a numeric code that prevents a user from accessing certain technical settings of a wireless device. It is normally designed to prevent a wireless device from being reprogrammed to work with a different wireless service provider. The data field 912 is optional and stores a network access identifier (NAI) username that may be submitted to a wireless service provider to gain network access authentication. While the wireless device is roaming, the NAI username is used to identify a user as well as to assist in the routing of an authentication request. NAI usernames often resemble email addresses but may not necessarily be the same as a user's e-mail address. The content of the optional data field 914 is used in conjunction with the NAI username, if authentication requires the use of a password.

The optional data fields 916-920 include home agent (HA) related information that allows the eBook reader device to send and receive data. The HA is generally a router used by a wireless service provider that maintains information about the wireless device's current location. The HA uses tunneling mechanisms to forward Internet traffic so that a wireless device's Internet protocol (IP) address does not have to be changed each time the device connects from a different location. HAs are known in the art, so additional description is not provided herein.

Exemplary Computing Device

Figure 10:
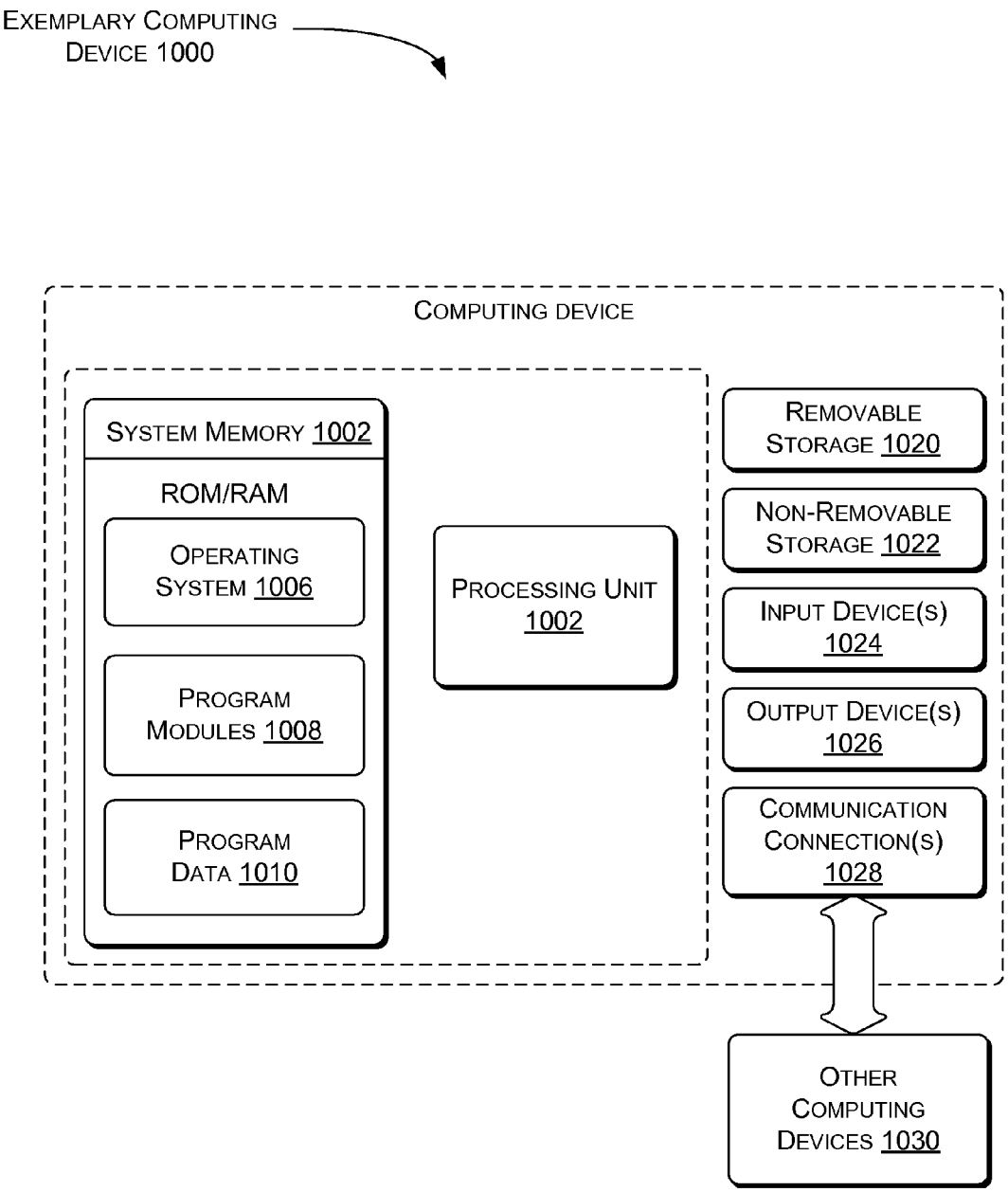
FIG. 10 is a block diagram illustrating functional components in a computing device that might be used to implement the various elements described herein.

FIG. 10 is an illustrative computing device that may be used to implement the computing devices discussed herein. In a very basic configuration, the computing device 1000 includes at least one processing unit 1002 and system memory 1004. Depending on the exact configuration and type of computing device 1000, the system memory 1004 may be volatile (such as RAM), non-volatile (such as ROM and flash memory) or some combination of the two. The system memory 1004 typically includes an operating system 1006, one or more program modules 1008, and may include program data 1010.

For the present implementations, the program modules 1008 may realize the various elements described as being associated with the provisioning and activation environment 100. Other modules described herein may also be part of the program modules 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1020 and non-removable storage 1022. Computer storage media may include volatile and nonvolatile, removable and non-removable media implemented in any method or technology for storage of information, such as computer readable instructions, data structures, program modules, or other data. The system memory 1006, removable storage 1020 and non-removable storage 1022 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of the device 1000. Computing device 1000 may also have input device(s) 1024 such as keyboard, mouse, pen, voice input device, and touch input devices. Output device(s) 1026 such as a display, speakers, and printer, may also be included. These devices are well know in the art and need not be discussed at length.

The computing device 1000 may also contain a communication connection 1028 that allow the device to communicate with other computing devices 1030, such as over a network like the network 106 of FIG. 1. The communication connection may also enable the computing device 1000 to wirelessly communicate with many different types of wireless service providers. Such wireless service providers may use code division multiple access (CDMA), GSM, time division multiple access (TDMA), and so forth, protocol technologies to enable wireless devices to efficiently communicate with other communication devices. Communication connection(s) 1028 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth, for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic media device, comprising:
   wireless communications technology that provides wireless communications connectivity over a wireless network supported by a wireless service provider that is a separate entity from a provider of the electronic media device;
   a storage containing a temporary number that enables wireless self-activation of the electronic media device through wireless communication with the wireless service provider, the storage storing a permanent number in place of the temporary number following the self-activation; and
   wherein the electronic media device obtains, for a fee and over the wireless network, at least a portion of an electronic book from a content provider that has also replaced the temporary number with the permanent number following the self-activation of the electronic media device, the content provider being a separate entity from the wireless service provider and paying to the wireless service provider at least part of the fee to at least partly cover a cost associated with use of wireless network by the electronic media device.

2. The electronic media device as recited in claim 1, wherein the electronic media device is an electronic book reader device.

3. The electronic media device as recited in claim 1, wherein the electronic book comprises digital representations of printed works, including at least one of a book, a periodical, a magazine, a textbook, a map, and a newspaper.

4. The electronic media device as recited in claim 1, wherein the content provider charges the fee when the electronic media device purchases at least some of the electronic book, the fee being used toward payment of the cost.

5. A method, comprising:
   receiving an order for an electronic book reader device to be delivered to a customer, the electronic book reader device being provided by a device provider;
   fulfilling the order by (1) provisioning an electronic book reader device with a temporary number for self-activation over a wireless network with a wireless service provider when first powered on by the customer and (2) providing for delivery of the electronic book reader device to the customer, the wireless service provider being a separate entity from the device provider;
   receiving, at the device provider and from the wireless service provider, an indication that the electronic book reader device has been first powered on by the customer and in response has been associated with a permanent number in place of the temporary number;
   replacing, at the device provider, the temporary number with the permanent number associated with the electronic book reader device;
   receiving a request from the electronic book reader device over the wireless network for at least a portion of an electronic book provided by a content provider; and
   providing, from the content provider, at least a portion of the electronic book to the electronic book reader device over the wireless network.

6. A method as recited in claim 5, wherein the wireless network comprises a cellular network.

7. A method as recited in claim 5, wherein the fulfilling is performed by a fulfillment center, and the device provider and the fulfillment center are commonly owned by a single entity.

8. A method as recited in claim 5, wherein the device provider and the content provider are commonly owned by a single entity.

9. A method as recited in claim 5, wherein the fulfilling is performed by a fulfillment center, and the device provider, the fulfillment center, and the content provider are commonly owned by a single entity.

10. A method as recited in claim 5, wherein the device provider is an ecommerce merchant.

11. A method as recited in claim 5, wherein the device provider is a device manufacturer.

12. A method as recited in claim 5, wherein the content provider pays, to the wireless service provider, at least a portion of a cost associated with use of the wireless network by the electronic book reader device.

13. A method, comprising:
   receiving an order for an electronic book reader device to be delivered to a customer, the electronic book reader device being provided by one of a content provider or a device provider;
   fulfilling the order by (1) provisioning an electronic book reader device with a temporary number for self-activation over a wireless network with a wireless service provider when first powered on by the customer and (2) providing for delivery of the electronic book reader device to the customer, the wireless service provider being a separate entity from the device provider and the content provider;

receiving, at the content provider and from the wireless service provider, an indication that the electronic book reader device has been first powered on by the customer and in response has been associated with a permanent number in place of the temporary number;

replacing, at the content provider, the temporary number with the permanent number associated with the electronic book reader device;

receiving a request from the electronic book reader device over the wireless network for at least a portion of an electronic book provided by the content provider; and providing, from the content provider, at least a portion of the electronic book to the electronic book reader device over the wireless network.

14. A method as recited in claim 13, wherein the wireless network comprises a cellular network.

15. A method as recited in claim 13, wherein the fulfilling is performed by a fulfillment center, and the device provider and the fulfillment center are commonly owned by a single entity.

16. A method as recited in claim 13, wherein the device provider and the content provider are commonly owned by a single entity.

17. A method as recited in claim 13, wherein the fulfilling is performed by a fulfillment center, and the device provider, the fulfillment center, and the content provider are commonly owned by a single entity.

18. A method as recited in claim 13, wherein the content provider is an ecommerce merchant.

19. A method as recited in claim 13, wherein the device provider is a device manufacturer.

20. A method as recited in claim 13, wherein the content provider pays, to the wireless service provider, at least a portion of a cost associated with use of the wireless network by the electronic book reader device.

21. A method, comprising:

receiving an order for an electronic book reader device to be delivered to a customer, the electronic book reader device being provided by one of a content provider or a device provider;

providing for delivery of the electronic book reader device to the customer, wherein the electronic book reader device includes a temporary number for self-activation over a wireless network when first powered on by the customer, the wireless network being supported by a wireless service provider that is a separate entity from the content provider and the device provider;

receiving, at one of the content provider or the device provider and from the wireless service provider, an indication that the electronic book reader device has been first powered on by the customer and in response has been associated with a permanent number in place of the temporary number;

replacing, at one of the content provider or the device provider, the temporary number with the permanent number associated with the electronic book reader device;

receiving a request from the electronic book reader device over the wireless network for at least a portion of an electronic book; and providing at least a portion of the electronic book to the electronic book reader device over the wireless network.

22. A method as recited in claim 21, wherein the wireless network comprises a cellular network.

23. A method as recited in claim 21, wherein the content provider is an ecommerce merchant.

24. A method as recited in claim 21, wherein the device provider is a device manufacturer.

25. A method as recited in claim 21, wherein one of the content provider or the device provider pays, to the wireless service provider, at least a portion of a cost associated with use of the wireless network by the electronic book reader device.

26. The electronic media device as recited in claim 1, wherein the provider of the electronic media device and the content provider are commonly owned by a single entity.

27. The electronic media device as recited in claim 1, wherein the provider of the electronic media device is a separate entity from the content provider.

* * * * *